Jan. 4, 1966  I. KAMLUKIN  3,226,853
POWER DRIVEN TRACTOR MOUNTED IMPLEMENT
Original Filed Aug. 8, 1960  7 Sheets-Sheet 1

Inventor
Igor Kamlukin
Attorney

Jan. 4, 1966   I. KAMLUKIN   3,226,853
POWER DRIVEN TRACTOR MOUNTED IMPLEMENT
Original Filed Aug. 8, 1960   7 Sheets-Sheet 5

Inventor
Igor Kamlukin

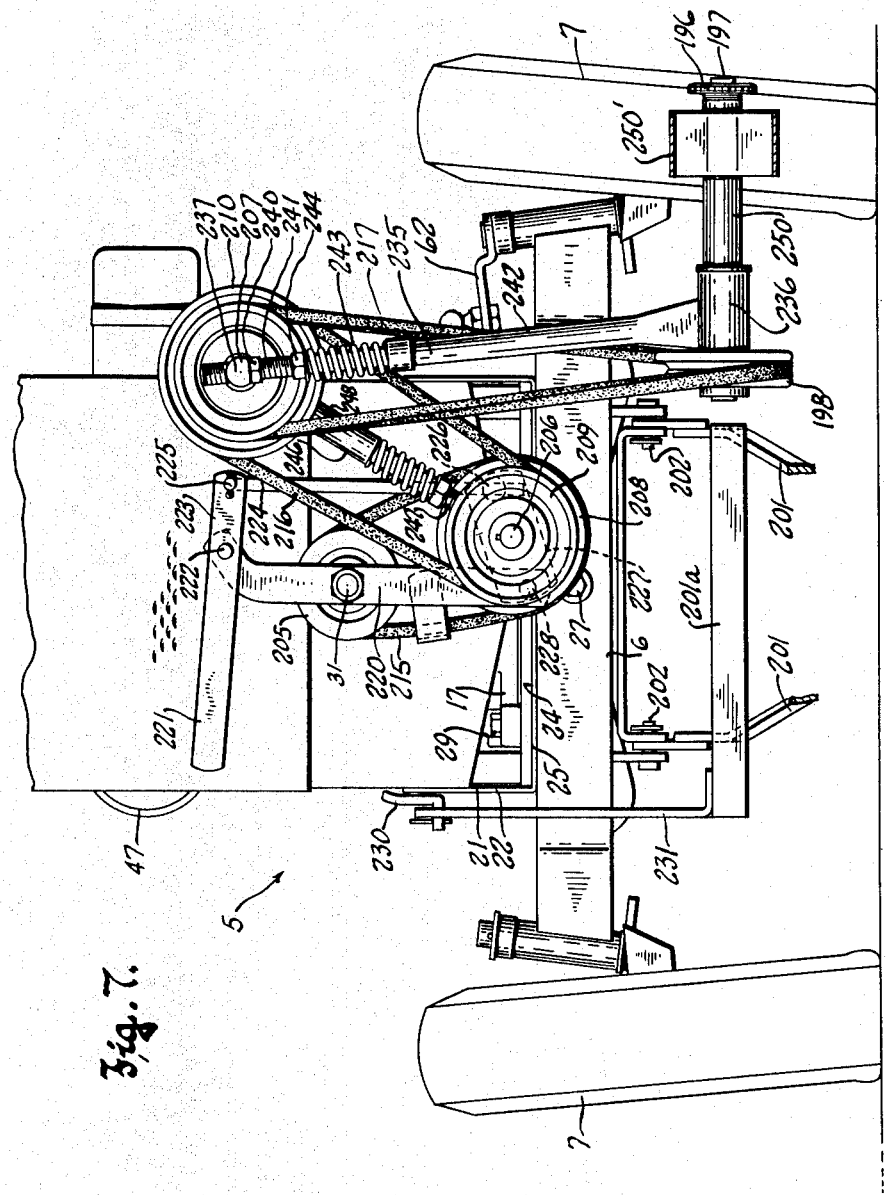

United States Patent Office 3,226,853
Patented Jan. 4, 1966

3,226,853
POWER DRIVEN TRACTOR MOUNTED
IMPLEMENT
Igor Kamlukin, Milwaukee, Wis., assignor to Simplicity Manufacturing Company, Port Washington, Wis., a corporation of Wisconsin
Application Mar. 19, 1963, Ser. No. 266,258 which is a division of application Ser. No. 48,239, Aug. 8, 1960. Divided and this application Mar. 9, 1964, Ser. No. 350,417
5 Claims. (Cl. 37—43)

This application is a division of my copending application, Serial No. 266,258, filed March 19, 1963, now abandoned, which is in turn a division of my application Serial No. 48,239, filed August 8, 1960.

This invention relates to power driven lawn and garden equipment, and has more particular reference to improvements in tractors of the so-called riding type and power driven implements which may be mounted thereon and driven thereby.

One of the primary purposes of the invention resides in the provision of a power unit which is adapted to be coupled with lawn and garden equipment of the type having rotatable or otherwise movable work-performing instrumentalities which must be driven from the power unit.

From this it will be seen that it is one of the main objects of the invention to provide a power unit or tractor which is especially designed to be coupled with any of a wide variety of implements to provide both propulsion for such implements and a power source by which their rotatable or otherwise movable work-performing instrumentalities are driven.

A further object of the invention resides in the provision of an improved power unit or tractor of the character described, having several power take-offs located forwardly, rearwardly and at one side of the tractor, in such positions as to enable a wide variety of implements to be readily coupled to the tractor for travel therewith and to have rotatable or otherwise movable instrumentalities thereof drivingly connected with the power take-offs in such a manner that the driving connection to any such implement will not be affected by bodily movement of the implement relative to the tractor, and can be maintained when the implement is raised from its operative position, as well as when it is in its operative position, or, at the option of the operator, can be disrupted in any position of the implement.

Still another object of the invention resides in the provision of an improved power unit or tractor of the character described, having means for connecting various implements both to the front and to the rear of the tractor, which means enables the implements to be raised out of operating position by a unique lever and link system which provides for the counterbalancing of an implement at one end of the tractor by a weight attached to the implement attaching means on the other end of the tractor.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of the physical embodiments of the invention constructed according to the best modes so far devised for the practical application of the principles thereof, and in which.

Figure 5:
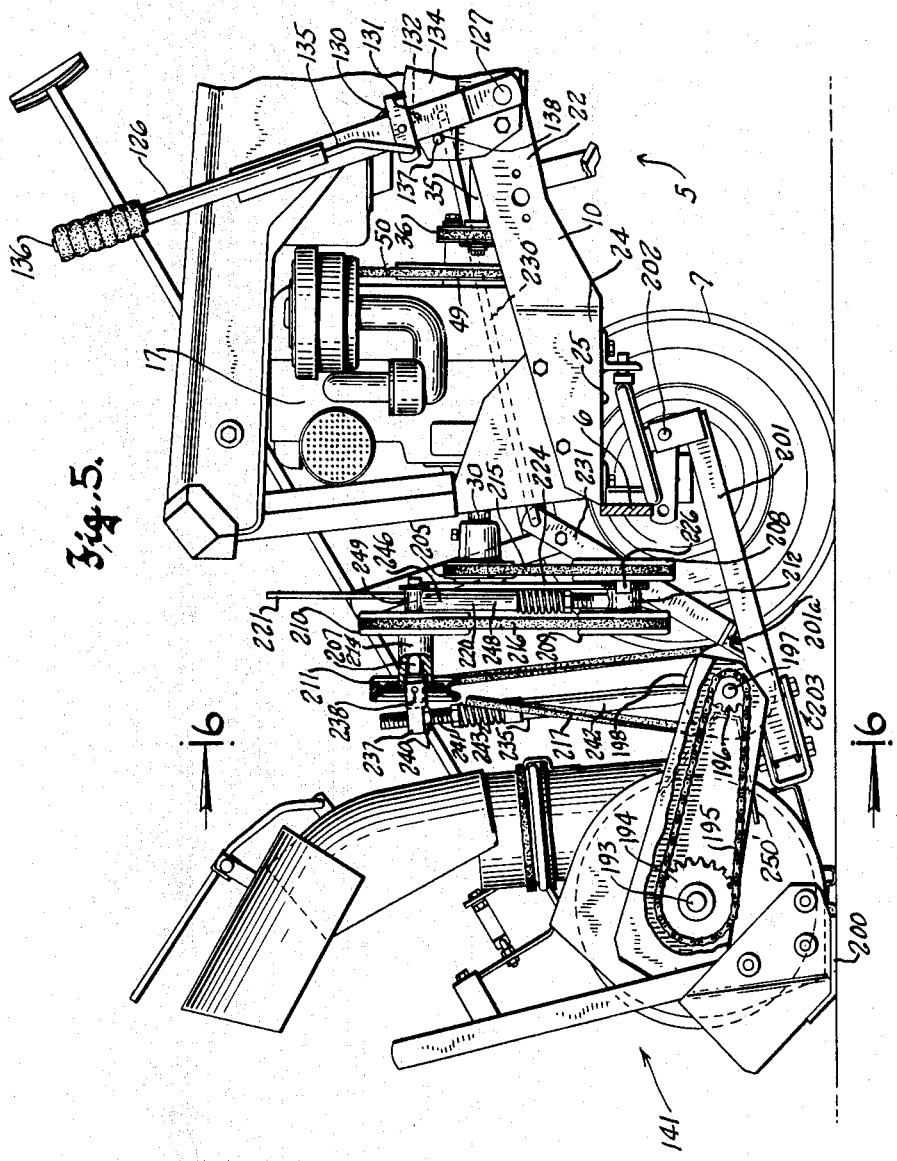
FIGURE 5 is a fragmentary side elevational view of the front portion of the tractor shown with a snow throwing unit coupled thereto and driven thereby so as to convert the tractor into a snow removing device.
Figure 6:
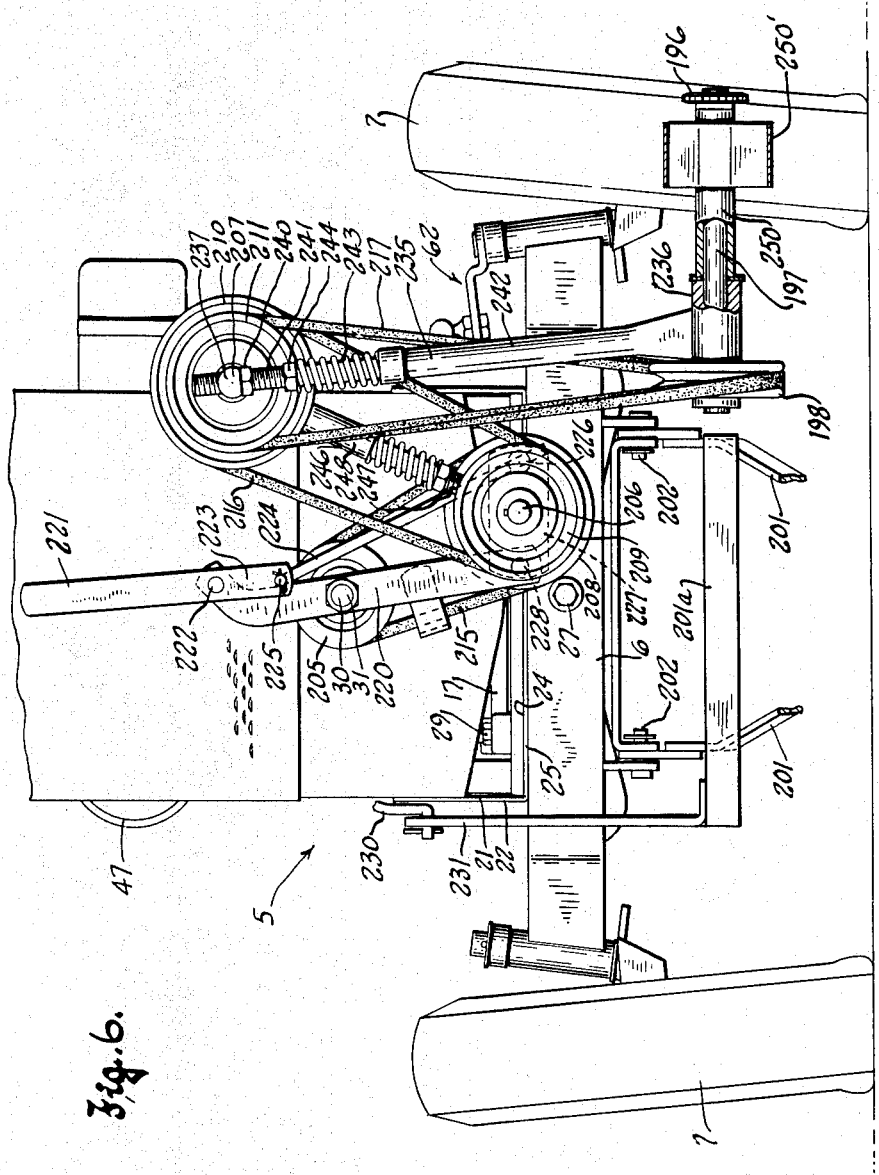

FIGURE 6 is a front view on a larger scale of the snow removing device with the main portion thereof removed, and viewing the same generally along the plane of the line 6—6 in FIGURE 5, to illustrate the manner in which torque is transmitted from the front power take-off of the tractor to the rotor of the snow throwing unit; and FIGURE 7 is a view similar to FIGURE 6, but with the drive to the snow thrower rotor shown disengaged.

Referring now more particularly to the accompanying drawings, the numeral 5 generally designates the chassis of the power unit or tractor of this invention, which is comprised of a front axle 6 having steerable wheels 7 at its ends, a rear axle 8 having larger drive wheels 9 on the opposite ends, and centrally disposed longitudinal frame means 10 connecting the medial portions of the front and rear axles to at all times maintain the same in an attitude normal to the length of the frame means and spaced apart a distance to accommodate a rotary lawn mowing device 12 between the front and rear wheels. The lawn mowing device 12 is shown, by way of example only, in FIGURE 2.

Mounted on the extreme forward end of the frame means is an internal combustion engine 17 which drives the tractor and powers the implements connected thereto. With the forward disposition of the engine described, an operator of the tractor may occupy a seat 18 mounted on the frame means 10 at the rear of the tractor, substantially directly above the rear axle 8. Fenders 18a extend outwardly and upwardly at the sides of the seat, over the rear wheels and one of them serves as a guard for a belt 41 to be described hereinafter.

The frame means 10 comprises a channel-shaped main frame section 22 which extends from the seat 18 forwardly to the front axle 6, where it terminates a short distance above the front axle, and a transmission housing 14 mounted on the rear axle 8. The transmission housing is rigidly connected to the rear portion of the channel-shaped frame section 22 by means of a pair of opposite forwardly extending plates 20 secured to the transmission housing at their rear and affixed to the opposite upright side flanges 21 of the channel-shaped main frame section.

That portion of the frame section 22 which is located immediately ahead of the driver's seat 18 is at an elevation above both of the axles of the tractor, and substantially at the level of the tops of the smaller front wheels 7 of the tractor. About midway between the forward portion of the seat 18 and the front axle, the channel-shaped frame section 22 is bent downwardly to terminate in a downwardly offset and widened front end portion 24, the web 25 of which lies horizontally a short distance above the level of the front axle 6.

The front axle is connected to the downwardly offset front end portion 24 of the frame means by swivel joint means 27 which permit the front axle to have up-anddown rocking motion about a longitudinal axis substantially medially between the wheels 7 at its ends.

The internal combustion engine 17 is nested in the widened, downwardly offset front portion 24 of the frame means, between the flanges thereof, and rests upon and is secured to the web 25 of the channel as by means of bolts 29 passing through mounting ears on the base of the engine and through the web. The engine is so oriented as to have its crankshaft 30 disposed on an axis which extends longitudinally of the tractor and lies substantially midway between the side flanges 21 of the elevated portion of the channel-shaped frame section ahead of the driver's seat. It is important to note that the projecting portion of the engine crankshaft which would be considered its normal power take-off end 31 extends forwardly of the tractor to be accessible thereat as an implement drive power take-off, while the flywheel end 32 of the crankshaft faces rearwardly so that cooling air which is moved across the hot parts of the engine by impeller blades 33 on the flywheel is blown forwardly over the engine, away from an operator occupying the seat 18.

This forward disposition of the air-cooled internal combustion engine 17 is important for several reasons. It makes for good weight distribution, with the engine located close to and above the front axle 6 while the weight of the transmission 14 and the driver occupying the seat 18 are over the rear axle 8. It also facilitates the transmission of driving torque to the rear wheels by means which includes an elongated rearwardly extending torque shaft 35 disposed substantially coaxially with the crankshaft 30 and which connects the crankshaft with a main transverse drive shaft 38 journaled in a gear box 37 mounted on the frame means 10 beneath the driver's seat, between the plates 20 of the frame means.

Figure 3:
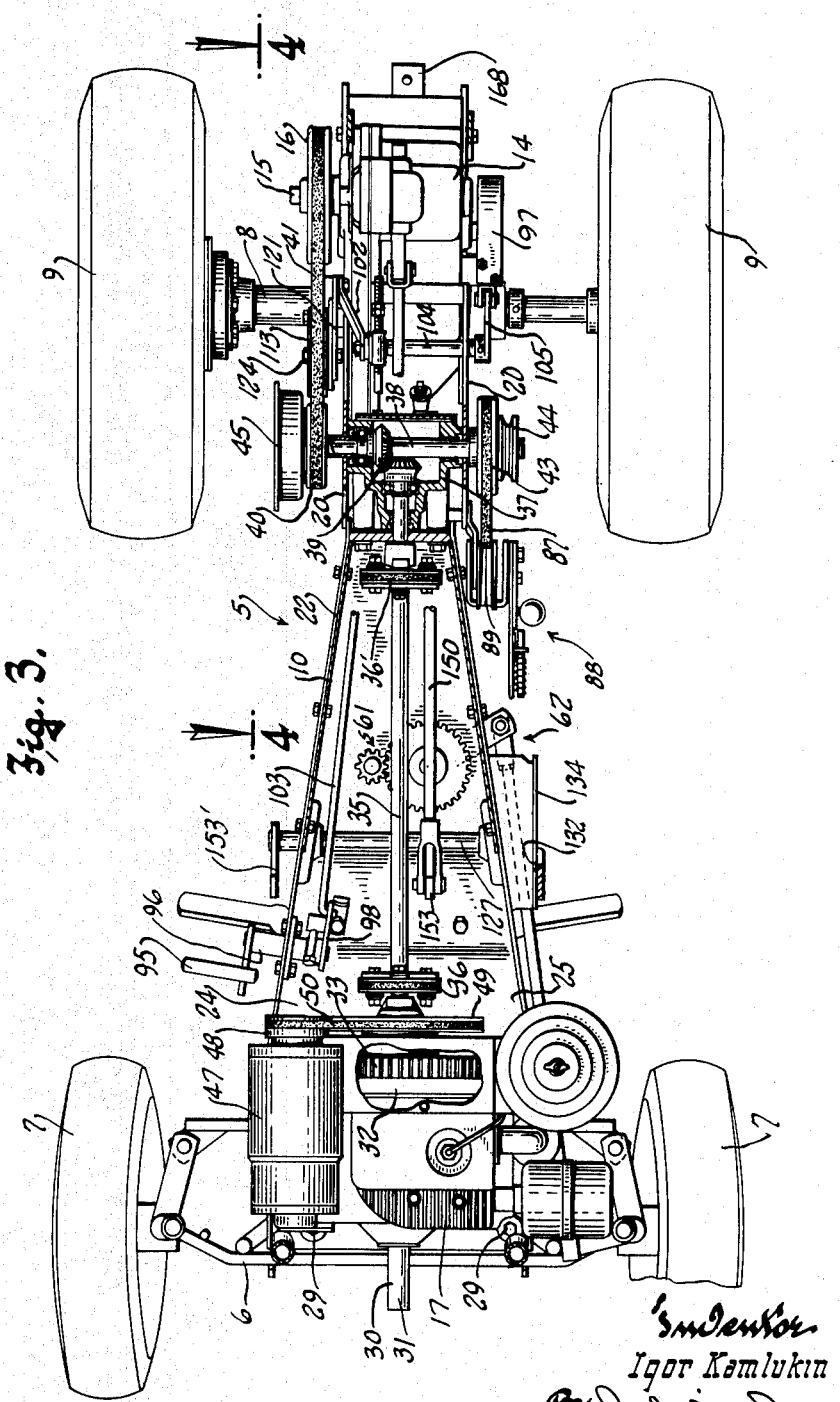
FIGURE 3 is a view, partly in plan and partly in longitudinal section, looking down upon the chassis of the tractor substantially along the line 3—3 of FIGURE 2.

The forward end of the torque shaft 35 is coaxially connected with the flywheel 32 of the engine by means of a flexible coupling 36, and a similar flexible coupling 36' intermediate the ends of the torque shaft, just ahead of the gear box, accommodates slight misalignments between the engine and the gear box. As best seen in FIGURE 3, the connection between the torque shaft and the main transverse drive shaft 38 comprises cooperating bevel gears 39 on said shafts, housed in the gear box 37.

The ends of the main transverse drive shaft 38 project to opposite sides of the frame means of the chassis, with one end of the drive shaft having a drive or output pulley 40 thereon. Journaled in the transmission housing 14 is an input shaft 15 having an input pulley 16 on one end thereof which aligns edgewise with the drive or output pulley 40 on the transverse drive shaft 38. A V-belt 41 encircling the pulleys 16 and 40 provides for drivingly connecting the torque shaft 35 with the transmission input shaft 15 so that driving torque can be transmitted from the internal combustion engine 17 to the rear wheels 9 of the tractor through the customary gearing (not shown) within the transmission housing.

The provision of the transverse drive shaft 38, at a location close to the rear axle of the tractor, is another important feature of the tractor of this invention. Its advantage resides in the fact that it is adapted to provide a power take-off from which driving torque can be transmitted to certain types of implements that may be coupled to the tractor. To this end the transverse drive shaft 38 may be provided, and its end remote from the output pulley 40, with a pair of power take-off pulleys 43 and 44. The transverse drive shaft 38 can also have a rope starter drum 45 secured thereto, adjacent to the output pulley 40, to facilitate starting of the internal combustion engine 17 from a location adjacent to the rear of the tractor. To provide access to the rope starter drum 45, the operator's seat 18 is supported from the chassis for upward and rearward swinging motion about a pivot 46 having a transverse axis behind the seat, out of its operative position (seen in FIGURE 2), to an elevated position (seen in FIGURE 4). It will be seen that the transverse drive shaft 38 can be used for the rope starter connection because of the fact that said shaft is at all times drivingly connected with the crankshaft of the engine.

If desired, automatic starting of the air-cooled internal combustion engine 17 can be provided for by means of a combination electric starter motor and generator 47 supported by the chassis in a position alongside the engine and having its drive pulley 48 drivingly connected, by means of a V-belt 50, with a larger pulley 49 which is connected with the flywheel end of the engine crankshaft. In order to permit the belt 50 to be trained about the pulleys 48 and 49, or to be removed therefrom whenever necessary, one or both of the flexible couplings 36 and 36' of the torque shaft 35 can be disassembled for either complete or partial removal of the torque shaft.

The transmission and rear axle construction are substantially conventional. For details of them reference may be made to my afore-mentioned copending application.

The transmission provides three speeds forward and one in reverse for the tractor. Its gears are shifted by means which includes a shift lever 57 that projects upwardly through a cover 58 over the horizontal raised portion of the channel-shaped main frame section 23, so as to be easily accessible to an operator occupying the seat 18.

The tractor is also provided with steering gear, including a steering wheel 59 on the upper end of a steering column 60 which is operatively connected to the front wheels through gears 61 and linkage 62. The steering wheel 59, of course, is located ahead of the gear shift lever 57 so that it too is readily accessible to an operator occupying the seat 18.

Figure 1:
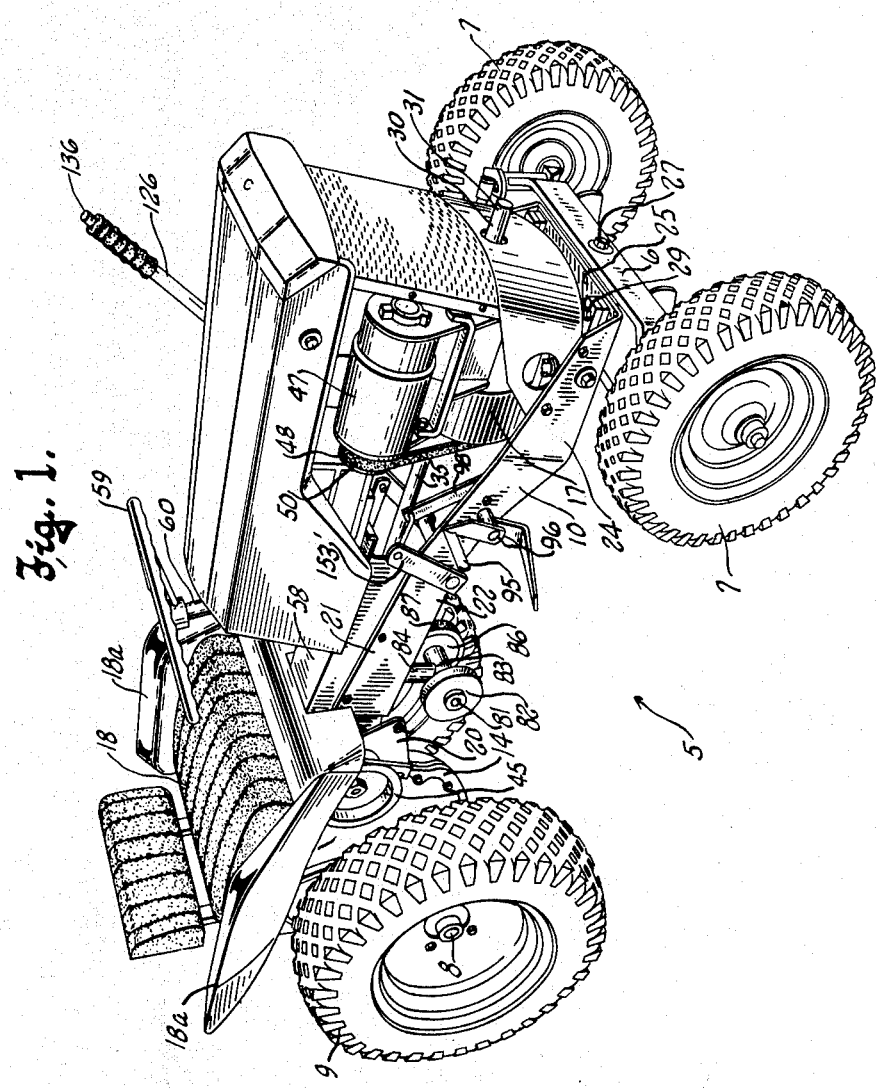
FIGURE 1 is a perspective view of the power unit or tractor of this invention, as seen from the front and one side.
Figure 2:
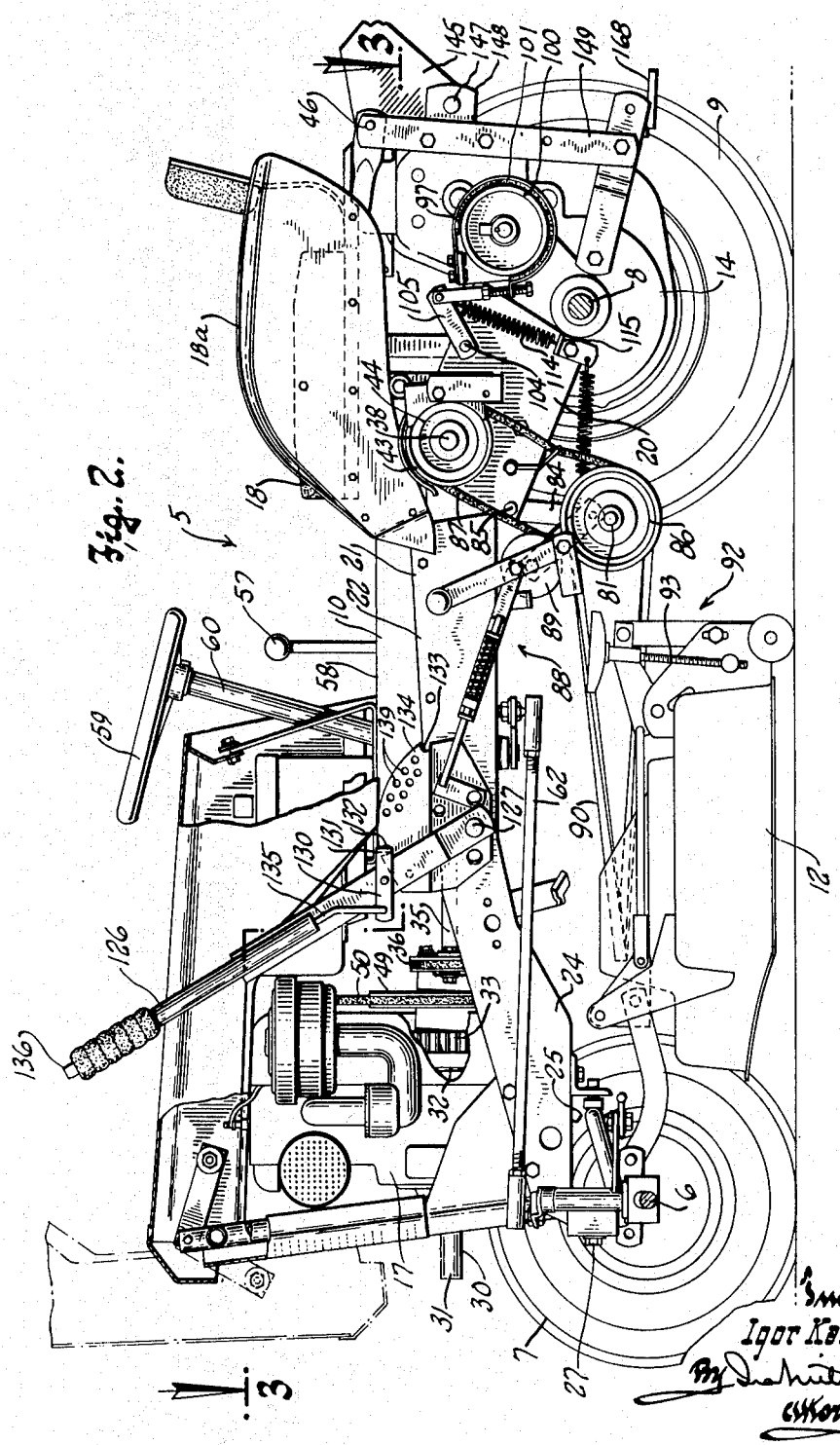
FIGURE 2 is a side elevational view on a larger scale of the power unit illustrated in FIGURE 1, with portions broken away to better illustrate the placement of the components of the power unit and other details of construction.

As indicated in FIGURE 2, the tractor is readily convertible to a power driven lawn mowing device of the riding type by the attachment of a rotary lawn mower 12 to the front axle of the tractor in the manner disclosed in Patent No. 2,924,928 issued to Igor Kamlukin and Nolan Rhoades on February 16, 1960. Similarly, the blades of the rotary lawn mower may be driven from a power take-off pulley 82 in the manner illustrated in the aforesaid patent. For this purpose a transverse bearing 83 is suspended by means of a tubular hanger 84 from a crosspin 85 having its ends anchored in the plate-like frame members 20, so that the bearing 83 can swing back and forth, about an axis which is parallel to but slightly below and forwardly of the main transverse drive shaft 38. The bearing 83 freely rotatably journals a shaft 81 having the power take-off pulley 82 secured to one end thereof and an input pulley 86 secured to its opposite end, so that the pulleys rotate in unison. A belt 87 is trained around the input pulley 86 and the output pulley 43 on the main drive shaft 38 and the driving connection through the belt can be engaged or disrupted, at the will of the operator, by means of a manually operable overcenter type shift mechanism 88 which comprises an idler pulley 89 that can be swung forwardly away from the belt 87, as seen in FIGURE 2, to disconnect the drive between the main transverse drive shaft 38 and the power take-off shaft 81, or can be swung rearwardly to an operative position at which it tensions the belt 87 into driving relationship with its pulleys 43 and 86. The power take-off pulley 82 on the power take-off shaft 81 is connectible by means of a quarter-twist belt 90 with the pulley (not shown) of the rotary lawn mower, so as to transmit rotation to the blades of the mower whenever the manually operable shift mechanism 88 is in an operative position.

The rotary lawn mower 12 is, in most respects, similar to that disclosed in the aforesaid Patent No. 2,924,928, except that it is provided with a lever and link system 92, controlled by a handscrew 93, by which the mower body can be translatingly adjusted either up or down, both during operation of the mower unit and when it is at rest, to provide for adjustment of cutting height.

A foot pedal 95 mounted on a stub shaft 96 in a flange at the front portion of the main frame member provides an actuating lever for controlling engagement and disengagement of the drive from the transverse drive shaft 38 to the input shaft 15 of the transmission. Also, when the foot pedal 95 is swung forwardly about the axis of the shaft 96 beyond the point where it effects disengagement of the transmission drive, it effects application of a brake 97, located at the side of the chassis remote from the input pulley of the transmission, and by which the rear wheels may be held against motion. The shaft 96 is keyed to the foot pedal and to an arm 98 which projects upwardly and slightly rearwardly from the shaft and which is biased to swing downwardly and rearwardly by means of a tension spring 99 connected between the upper end of the arm and an anchor on the web of the main frame member.

The brake comprises a brake drum 100 fixed to one of the shafts of the transmission 14 and a brake band 101 which can be tightened around the drum by means of a linkage connected with the foot pedal actuated arm 98 and which includes a lever 102 near the rear of the tractor and connected with the arm 98 by an elongated link rod 103, a shaft 104 to which the lever 102 is swingably secured, and a second lever 105 fixed to the shaft 104 and connected with the brake band. For further details of the brake structure reference may be made to my aforementioned copending application.

The initial motion of the brake pedal 95, which is permitted to occur before tightening of the brake band abouts its drum commences, is relied upon to effect disengagement of the driving connection between the output pulley 40 on the main transverse drive shaft 38 and the input pulley 16 on the transmission. This is accomplished by means of an idler or belt-tightening pulley 113 which is mounted for up-and-down motion, to and from a belt-tightening position (illustrated in FIGURE 4) in which it is normally held engaged under upward bias with the lower stretch of the belt 41. The belt-tightening pulley 113 is freely rotatably journaled on a bolt 124 or the like which is mounted in the elbow of a bell crank lever 121. The extremity of the lower arm 122 of the bell crank lever is carried on a pivot 123 which is secured in and projects from the side of the transmission housing 14, to mount the bell crank lever for swinging motion by which the belt-tightening pulley 113 is carried up and down. The upper arm 125 of the bell crank lever is connected with a swivel bolt 106 in the upper end of the lever 102 by means of a link 118, the upper end of which is pivoted on the swivel bolt and the lower end of which is connected with the extremity of the upper arm 125 of the bell crank lever by a pivot 120.

A substantially strong tension spring 114 has its lower end connected to the frame means, as at 115, and its upper end connected to the outer end of the lever 105 on the cross shaft 104. Bearing in mind that the levers 102 and 105 are both connected to the cross shaft 104 so that they are constrained to swing in unison about the axis of said shaft, it will be seen that the spring 114 tends to hold the brake released, and, through lever 102 and link 118, maintains a force upon the bell crank lever 121 that tends to hold the belt-tightener pulley 113 in its upward position in which it maintains the belt 41 in driving engagement with its pulleys 40 and 16.

Figure 4:
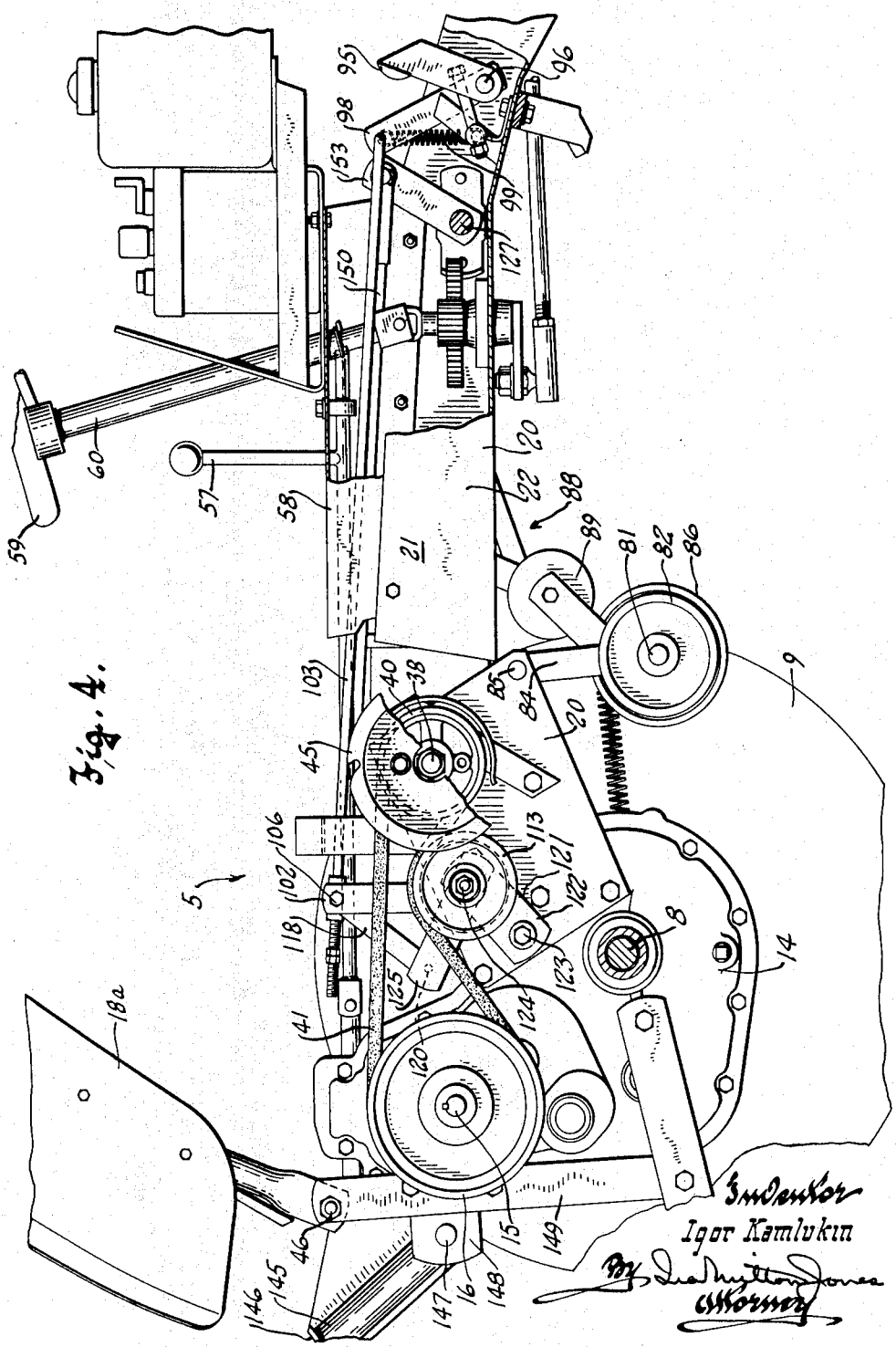
FIGURE 4 is an enlarged detail view of the rear portion of the tractor, taken substantially along the plane of the line 4—4 in FIGURE 3.

With this arrangement, it will be seen that the elongated link 103 can be drawn endwise forwardly by the combined clutch and brake pedal 95 to cause the lever 102 to swing clockwise (as viewed in FIGURE 4) about the axis of its cross shaft 104, to also cause the bell crank lever 121 to rock in a clockwise direction about its pivot 123, thereby imparting downward belt loosening motion to the idler pulley 113 carried thereby. When the combined brake and clutch pedal is released by the operator, the spring 99 returns the pedal and the elongated link 103 to their rearmost positions, shown in FIGURE 4, and the tension spring 114 reacts through the lever and link system 117 to return the belt tightener pulley 113 to its operative position as shown in FIGURE 4.

At its side opposite the foot pedal 95, the tractor is provided with an elongated upwardly extending implement lift lever 126, the lower end of which is pivotally connected with the channel-shaped medial portion of the main frame means, as at 127, to provide for fore and aft swinging movement of the lift lever by which an implement connected with either the front or the rear of the tractor can be raised or lowered. In the present case, when the lever is moved toward its foremost position (shown in FIGURE 2), it moves an implement connected with the front of the tractor to a lowered or operative position or raises an implement connected to the rear of the tractor to an inoperative position. Similarly when the implement lift lever is swung to a rearmost position from that shown in FIGURE 2, it is adapted to hold an implement at the front of the tractor at an elevated inoperative position or to lower an implement connected with the rear of the tractor to its operative position.

The implement lift lever 126 is adapted to be releasably held in either of its extreme positions of motion by means of a medially pivoted latch 130 carried by the lever. At one end the latch 130 has a dog 131 that is selectively engageable in either a forward notch 132 or a rearward notch 133 in a sector-like plate 134 fixed to the side of the main frame member. The other end of the latch 130 is connected, by means of a rod 135, with a push button release 136 mounted in the grip portion at the top of the implement lift lever 126. When the push button 136 is depressed, the latch dog 131 is swung upwardly to disengage it from either of the notches 132 or 133 in the sector plate 134, freeing the implement lift lever for swinging motion either forwardly or rearwardly.

Depending upon the implement which is connected to either the front or the rear end of the tractor, the swinging motion of the implement lift lever may be limited, as suggested in FIGURE 5, by the engagement of the forward edge of the lift lever with a pin 137 engaged in a forward aperture 138 in the front portion of the sector plate 134, or by the engagement of the rear edge of the lift lever with a similar pin engaged in any one of a series of apertures 139 in the rear portion of the plate. As will be explained later, a pin is normally inserted in the aperture 138 whenever a snow thrower unit 141 is coupled to the front of the tractor and driven thereby, to limit the forward swinging motion of the implement lift lever and prevent the latch dog 131 from engaging in the forward notch 132, thus allowing the snow thrower to rise and descend as it accommodates itself to irregularities in a surface being cleared.

The power unit or tractor of this invention can be converted to a snow removing device at the attachment to its front of a snow removal unit 141 which is of the type having a rotor that comprises blade means (not shown) mounted on a transverse shaft 193 having a sprocket 194 secured thereon. The rotor shaft 193 is driven by a chain 195 trained around its sprocket 194 and a sprocket 196 on a rotor drive shaft 197 that is carried by the snow blower unit for free rotation on a transverse axis parallel to that of the rotor shaft 193 but rearwardly thereof. Also fixed to the rotor drive shaft 197, inwardly of the sprocket 196, is an input pulley 198 through which driving torque from the crankshaft of the engine can be transmitted to the rotor drive shaft and hence to the bladed rotor of the unit.

The snow thrower unit, which may be of generally conventional construction, includes a pair of transversely spaced apart skids 200 which are adapted to engage upon the surface from which snow is to be removed. The housing structure of the snow thrower unit is connected with the tractor, to be propelled thereby, by means of a pair of rearwardly divergent push bars 201, the rear extremities of which are pivotally connected by pins 202 with the front axle of the tractor, the pins aligning on a common transverse axis parallel to the front axle. From the pins 202 the bars 201 extend forwardly beneath the front axle of the tractor, and there is a loose connection, indicated at 203, between the convergent forward ends of the bars 201 and the housing structure of the unit, whereby the bars support the unit for bodily up-and-down motion relative to the tractor and for slight relative tilting between the snow thrower unit and the front of the tractor.

Referring to FIGURE 5, it will be noted that the bars 201 couple the snow thrower unit to the front of the tractor in such a manner that the unit is disposed ahead of the tractor with its rotor drive shaft 197, and especially its input pulley 198, located substantially midway between the rotor shaft 193 and the front axle of the tractor.

Rotation is transmitted to the input pulley 198 on the rotor drive shaft from an output pulley 205 secured to the projecting front end portion 31 of the engine crankshaft 30, by means which allows both up and down bodily movement of the snow thrower unit 141 relative to the front of the tractor and tilting movement of the snow thrower relative to the front of the tractor, such as is produced when one of its shoe 290 rides up over ice or packed snow while the other remains engaged with the surface from which snow is to be removed.

The means for transmitting rotation from the engine crankshaft to the rotor drive shaft, and consequently to the bladed rotor of the snow thrower, is best seen by reference to FIGURES 5 and 6 and comprises a first countershaft 206 located beneath the projecting end of the engine crankshaft and the output pulley 205, and a second countershaft 207 located above the level of the engine crankshaft and at a distance to one side thereof, substantially over the input pulley 198 on the rotor drive shaft. Both of these countershafts are disposed with their axes parallel to that of the engine crankshaft, and they are supported in a unique fashion which allows them to move bodily relative to one another and to the axis of the engine crankshaft. Before describing the means by which the countershafts are so supported, it should be noted that each has a pair of V-belt pulleys thereon, which are constrained to rotate in unison, there being an input pulley 208 and an output pulley 209 on the first countershaft 206, and likewise an input pulley 210 and an output pulley 211 on the second countershaft 207. A V-belt 215 provides for driving connection of the power take-off pulley 205 on the engine crankshaft with the input pulley 208 on the lower countershaft; and another V-belt 216 provides for driving connection of the output pulley 209 of the lower countershaft with the input pulley 210 on the upper countershaft. A third V-belt 217 provides for driving connection of the output pulley 211 on the upper countershaft with the input pulley 198 on the rotor drive shaft 197.

The first countershaft 206 is freely rotatably received in a bearing-like sleeve 212 which extends axially between the pulleys 208 and 209, and said pulleys are fixed to the shaft 206 so as to rotate in unison. The pulleys 210 and 211 on the second countershaft 207 are fixed on the opposite ends of a sleeve 214 which is freely rotatable upon the shaft 207, and they are constrained by their securement to the sleeve 214 to rotate in unison with one another. As will be explained shortly, the second countershaft 207 does not rotate in the same fashion as the first countershaft 206.

The pulleys on the two countershafts are, of course, so arranged that the input pulley 208 on the lower countershaft is in edgewise alignment with the power take-off pulley 205 on the crankshaft, while the output pulley 209 on the lower countershaft, which is located a distance axially forwardly of the input pulley 208, aligns edgewise with the input pulley 210 on the upper countershaft. Similarly, the output pulley 211 on the upper countershaft is substantially directly over the input pulley 198 on the rotor drive shaft 197.

The bearing-like sleeve 212 which rotatably carries the lower countershaft 206 is swingably supported from the lower end of a lever or carrier 220, the medial portion of which is pivotally journaled on the forwardly projecting power takeoff 31 of the engine crankshaft. Any suitable means of mounting the carrier or lever on the projecting front of the crankshaft may be provided, so as to enable the engine crankshaft to rotate freely while the lever remains more or less stationary in a nearly vertical position or swings from side to side about the crankshaft axis relatively to the front of the tractor.

The carrier or lever 220 forms part of a manually operable overcenter type belt-tightening and loosening device, by which the belt 215 connecting the power take-off pulley 205 with the input pulley 208 on the lower countershaft 206 may be either tightened into driving engagement with its pulleys, as shown in FIGURE 6, or loosened to disrupt the driving connection between said pulleys, as shown in FIGURE 7. For this purpose, an actuator 221 is medially pivotally connected, as at 222, to an offset upper portion of the carrier or lever 220, to swing relative to the lever about an axis parallel to that of the crankshaft. The upper end portion of the actuator forms a handle which is adapted to be grasped by an operator of the device, and it has a shorter portion 223 which extends below the pivot 222 toward the projecting front end of the crankshaft, the extremity of which is pivotally connected with the upper end 225 of a link or rod 224. The lower end of the rod 224 and the lower end of the actuator are pivotally connected with the opposite ends of an arm 227, which is freely rotatably mounted at its midportion upon the sleeve 212 in which the lower countershaft rotates. Preferably the rod 224 is connected to the lower end of the actuators 221 by having its upper end 225 bent from the rod proper and extending through a hole in the lower end of the short lower arm 223 of the actuator so as to provide the pivoted joint therewith. The lower end of the rod 224 is adjustably screw threaded into a stud 226 on the outer end of the arm 227. It will be seen that the arm 227 is more or less jointly supported by the rod 224 and the carrier or lever 220, to the lower end of which the inner end of the arm is pivotally connected, as at 228, and that the arm, which is disposed in a substantially horizontal position, cooperates with the lever 220 and the rod 224 in supporting the lower countershaft 206 from the front power take-off end portion 31 of the engine crankshaft, with the countershaft 206 disposed a distance beneath and slightly to one side of the engine crankshaft. It will also be seen that when the handle portion of the actuator 221 is swung counterclockwise, from the position shown in FIGURE 6 to the position shown in FIGURE 7, the arm 227 is carried upwardly by the rod 224, about its pivotal connection 228 with the carrier, to lift the first countershaft 206 and the input pulley 208 thereon toward the engine crankshaft and thus slacken the belt 215 to disrupt the driving connection between the engine and the snow thrower rotor. When actuator is swung in the direction to carry it from the inoperative position shown in FIGURE 7 to the operative position shown in FIGURE 6, the outer end of the arm 227 is, of course, forced downwardly by the rod 224, until the rod and the actuator are in a dead-center position of alignment. A slight further motion of the actuator in the same direction engages the bent upper end 225 of the rod 224 against the adjacent side of the upper arm of the carrier or lever 220, to releasably lock the overcenter mechanism in its operative position in which it maintains the belt 215 in driving relationship with its pulleys, and wherein the tension of the belt holds the knee joint provided by the connection 225 at the actuator side of its dead-center position.

By reason of this arrangement, the overcenter linkage which supports the lower countershaft 206 may be regarded, when it is in its operative position shown in FIGURE 6, as a rigid triangle swingable back and forth bodily about the axis of the power take-off and 31 of the engine crankshaft. Such oscillatory motion of this rigid triangle structure actually takes place during operation of the snow removing unit, due to the up-and-down or "floating" motion of the latter as it rides up and over packed snow or ice, and also occurs at such times as the unit may be held in an elevated position by means of the implement lift lever 126 described previously. The lift lever is operatively connected with the unit by a second lever 153' on its cross shaft 127, and a rod 230 having its rear end connected to the lever 153' and its forward end connected with an upwardly and rearwardly extending arm 231 fixed to a rigid brace or crosspiece 201a that spans the divergent portions of the push bars 201 and is connected to them. In the forward position of the implement lift lever shown in FIGURE 5, the snow thrower unit 141 is, in a sense, self-supporting by reason of the engagement of its shoes 200 with the surface from which snow is to be removed. It is for this reason that the implement lift lever cannot have the dog on its latch arm 130 engaged in the forward notch 132 of the sector like plate 134 when the snow thrower unit is connected to the front of the tractor; and to prevent such engagement a pin 137 is inserted in the foremost one of the holes in the sector-plate to limit the forward swinging motion of the implement lift lever, as indicated in FIGURE 5.

In order to maintain the belts 217 and 216 in driving engagement with their respective pulleys during operation fo the snow thrower unit, despite up and down movement of the unit relative to the tractor, spring loaded expansion links 246 and 235 are provided to connect the opposite ends of the upper countershaft 207 respectively with the lower countershaft 206 and with the rotor drive shaft 197. The longer one 235 of the spring loaded expansion links comprises a stem 241 which has its lower end portion telescopingly received in a tubular lower link member 242, and a compression spring 243 which reacts between the stem and the tubular member. Affixed to the lower end of the tubular member 242 is a transverse sleeve 236 which freely encircles a portion of the rotor drive shaft 197 adjacent to the input pulley 198 thereon. The upper end of the stem portion 241 of the expansion link 235 has a screw threaded connection with a knuckle 237 that in connected to a bifurcated forward extremity of the upper countershaft 207 by a pin 238 which extends transversely through said countershaft and is disposed on a horizontal axis, so that the knuckle 237 can have a limited degree of up-and-down swinging motion relative to the upper countershaft. The screw threaded connection between the upper end of the expansion link and the knuckle 237 provides for adjustment of the effective length of the link 235, and the link can be releasably locked in any desired position of such adjustment as by means of a lock nut 240 threaded on the upper end of the stem portion 241 of the link and engaging a flat on the underside of the knuckle. This connection between the link and the knuckle, of course, will at times cause the upper countershaft to turn on its axis, in consequence of side-to-side tilting motion of the snow thrower unit, while the knuckle swings to a limited degree relative to the upper countershaft at such times as the snow thrower unit moves bodily up and down relative to the tractor.

The compression spring 243 of the link 235 is confined between the upper end of the tubular member and a second nut 244 on the threaded upper end of the stem portion, to exert a force on the link which tends to separate its two components in an endwise direction and thus push upwardly upon the upper countershaft 207, thereby maintaining good tension upon the drive belt 217 which encircles the pulleys 211 and 198.

The other expansion link, generally designated 246, is similar to that just described and is connected between the upper countershaft 207 and the sleeve 212 in which the lower countershaft rotates. In this case, the threaded stem portion 247 of the link 246 has its lower extremity welded or otherwise secured to the medial portion of the sleeve 212, while the tubular upper member 248 of the expansion link is secured at its upper end to a short sleeve 249 in which the rear end portion of the upper countershaft 207 is rotatably received. By suitable adjustment of the spring force exerted in opposite directions upon the upper and lower countershafts by the expansion link 246, the belt 216 drivingly connecting the output pulley 209 of the lower countershaft with the input pulley 210 of the upper countershaft is maintained under suitable tension.

As may be seen from FIGURE 6, the sleeve 236 to which the expansion link 235 connects is held against axial motion relative to the rotor drive shaft 197 by reason of the fact that the sleeve 236 is confined endwise between the input pulley 198 on the rotor drive shaft and the inner end of a tubular bearing 250 for the rotor drive shaft. The bearing 250 is in turn welded or otherwise suitably secured to a bracket 250' fixed on the housing of the snow thrower unit. The sprocket 196 is fixed on the shaft 197 at the end of the bearing 250 which is remote from the sleeve 236.

Whenever the snow thrower unit 141 is lifted upwardly by passage of one or both of its shoes 200 over packed snow or ice, the expansion link 235 is lifted with the unit to carry the upper countershaft 207 upwardly a distance corresponding to the extent the snow thrower was lifted. Since the unit, in effect, swings up and down in an arc about the axis of the pins 202 to which the rear ends of the push bars 201 are connected, the lower end of the expansion link 235 has a slight fore-and-aft swinging motion imparted to it in consequence of such up-and-down movement, and this swinging movement of the expansion link relative to the countershaft 207 is accommodated by the pivotal connection of the knuckle 237 to said countershaft.

As the upper countershaft 207 is moved upwardly by rising motion of the snow thrower unit, transmitted to the countershaft by the expansion link 235, the lower countershaft 206 is caused to move upwardly with it, primarily because of the connection therewith afforded by the belt 216. In thus traveling upwardly, the lower countershaft is compelled to swing in an arc about the axis of the engine crankshaft, in a counterclockwise direction as seen in FIGURE 6, due to the suspension of the lower countershaft 206 from the now rigid triangle provided by the overcenter linkage. Despite the fact that both the upper and lower countershafts will move up and down with the up-and-down "floating" action of the snow thrower unit, good tension will at all times be maintained upon the belt 215 by reason of the overcenter linkage connection between the crankshaft and the lower countershaft 206, while the belt 216 is maintained under tension by the expansion spring forming part of the spring loaded expansion link 246, and the belt 217 is similarly maintained under tension under the influence of expansion link 235. Because the snow thrower unit 141 must be supported from the front of the tractor to move up and down relative thereto as well as to travel therewith during snow removal operations, the implement lift lever 126 must be in the position at which the dog on its latch lever cannot engage in the forward notch 132 of the sector-like plate 134 when the snow thrower unit is being used, but the lift lever can nevertheless be employed to move the snow thrower unit bodily upwardly to an inoperative or transit position in which it may be releasably held by the engagement of the dog on the free end of the latch lever 130 in the rear notch 133 of the sector plate. The snow thrower unit, when so latched in its elevated position, can be very advantageously used to clear snow that has drifted into large banks or piles.

What is claimed as my invention is:

1. In combination: a tractor having an elongated chassis including a front axle, a power source on the chassis comprising an internal combustion engine and a power take off pulley driven by the engine and rotatable about an axis fixed with respect to the chassis and extending lengthwise thereof; an implement coupled to the front of the tractor chassis, ahead of the front axle thereof, and having a rotatable tool, a rotor drive shaft drivingly connected with said tool and constrained to rotate on an axis fixed with respect to the implement, and a pulley on the drive shaft located intermediate the implement and the front axle of the tractor; means connecting the implement with the front of the tractor chassis to provide for bodily up and down movement of the implement relative to the tractor; and means for transmitting torque from said power take off pulley to the drive shaft pulley without interference from bodily up and down movement of the implement relative to the tractor, comprising first and second countershafts each having an input pulley and an output pulley constrained to rotate with the input pulley, means supporting the first countershaft from the front of the tractor for rotation about an axis parallel to but at a level spaced a distance beneath the axis of the power take off pulley and for bodily back and forth swinging movement about said axis of the power take off pulley, means supporting the second countershaft with its axis parallel to and at a level above that of the power take off pulley comprising a pair of link members one extending lengthwise between and connecting said drive shaft with said second countershaft and causing the latter to move bodily up and down with the implement, the other link member extending lengthwise between and connecting said second countershaft with the first countershaft and causing the latter to swing bodily about the axis of the power take off pulley in consequence of bodily up and down movement of the scond countershaft, a belt drivingly connecting the power take off pulley with the input pulley of the first countershaft, and endless belts drivingly connecting the input and output pulleys of the second countershaft respectively with the output pulley of the first countershaft and with the pulley on said drive shaft.

2. The combination of claim 1, wherein said link members comprise spring loaded expansion links which act upon the countershafts to effect tensioning of the belts which drivingly connect the input and output pulleys of the second countershaft respectively with the output pulley of the first countershaft and with the pulley on the drive shaft.

3. The combination of claim 1, wherein said means which supports the first countershaft from the front of the tractor for bodily swinging motion about the axis of the power takeoff pulley comprises a carrier constrained to rotary movement about the axis of the power take off pulley and having a portion thereof extending downwardly toward said first countershaft, an arm pivotally connected at one end to said portion of the carrier to move bodily therewith and to swing relative thereto about an axis parallel to that of the power take off pulley, and upon which arm the first countershaft is journaled so that swinging motion of the arm in opposite directions about its pivotal connection with the carrier shifts said first countershaft bodily toward and from the axis of the power take off pulley, overcenter linkage connecting an upper portion of the carrier with the other end of said arm, said linkage having a knee joint and being movable from a defined operative extended position with its knee joint dispose adjacent to one side of dead center and at which the linkage acts through said arm to hold the first countershaft swung away from the axis of the power take off pulley and the power take off belt tensioned about its pulleys, to a collapsed position at which the knee joint is disposed at the opposite side of dead center and the linkage acts through said arm to hold said first countershaft closer to the axis of the power take off pulley, to thus disrupt the belt drive between the power take off pulley and the input pulley on the first countershaft, said overcenter linkage being maintained in its operative extended position by the tension on the power take off belt.

4. The combination of claim 1, wherein said means which connects the implement with the front of the tractor comprises an arm on the implement extending rearwardly therefrom under the front axle of the tractor and pivotally connected thereto to provide for bodily swinging movement of the implement about a transverse axis adjacent to the front axle of the tractor.

5. In combination: an elongated frame; driving wheels mounted on the frame, at the rear thereof, for rotation on an axis transverse to the length of the frame; a front axle; means mounting the front axle on the frame, at the front thereof, for tilting motion of the front axle about an axis extending lengthwise of the frame and intermediate the ends of the front axle; a pair of front wheels, one rotatably mounted on each end of the front axle; an engine mounted on the frame; a power takeoff shaft rotatably carried by the frame near the front thereof, said shaft having its axis substantially vertically aligned with, and parallel to, the tilting axis of the front axle; an implement having a rotatable work performing member; a pair of laterally spaced apart rearwardly extending arms on the implement; means providing a tractive connection between the implement and the frame by which the implement is constrained to move back and forth with the frame but is swingable up and down relative to the frame about an axis parallel to the front axle, and providing for tilting of the implement with the front axle, said means comprising cooperating coupling elements on the rear ends of the arms and on the front axle, spaced to opposite sides of the tilting axis thereof; and endless drive transmission means connecting the power takeoff shaft with the rotatable member of the implement, said transmission means comprising a pair of articulated supporting elements, one carried by the frame and swingable about the axis of the power takeoff shaft and the other on the implement, a rotatable element carried by each of said articulated supporting elements for swinging motion therewith relative to the power takeoff shaft and the implement, endless power transfer means trained around the power takeoff shaft and the rotatable elements, and biasing means reacting between the articulated supporting elements to bias the rotatable elements apart and thereby maintain tension in the endless power transfer means.

References Cited by the Examiner

UNITED STATES PATENTS

| 1,662,809 | 3/1928 | Altgilbers | 37—43 |
| 2,154,353 | 4/1939 | Ploetz | 37—43 |
| 2,248,256 | 7/1941 | Stegeman | 74—228 |
| 2,376,250 | 5/1945 | Holmes | 37—43 |
| 2,442,731 | 6/1948 | Paul | 172—125 |
| 2,683,885 | 7/1954 | Johnson | 180—53 X |
| 2,688,832 | 9/1954 | Gordon | 172—79 |
| 3,055,127 | 9/1962 | Williamson | 37—43 |
| 3,065,811 | 11/1962 | Parrett | 180—70 |
| 3,128,729 | 4/1964 | Henson | 172—125 |

OTHER REFERENCES

Uren. Petroleum Production Engineering, N.Y., McGraw-Hill, 1939, p. 278, TM 87007.

CHARLES E. O'CONNELL, *Primary Examiner.*

BENJAMIN HERSH, *Examiner.*